(12) United States Patent
Neal et al.

(10) Patent No.: US 9,364,924 B2
(45) Date of Patent: Jun. 14, 2016

(54) METHOD AND APPARATUS FOR REPAIRING A CYLINDER HEAD

(71) Applicants: Kennieth Neal, Mesa, AZ (US); Eugene Neal, Mesa, AZ (US)

(72) Inventors: Kennieth Neal, Mesa, AZ (US); Eugene Neal, Phoenix, AZ (US); Eric Wilderson, Medford, OR (US)

(73) Assignees: Kennieth Neal, Mesa, AZ (US); Eugene Neal, Phoenix, AZ (US)

(*) Notice: Subject to any disclaimer, the term of this patent is extended or adjusted under 35 U.S.C. 154(b) by 337 days.

(21) Appl. No.: 14/174,076

(22) Filed: Feb. 6, 2014

(65) Prior Publication Data

US 2015/0101190 A1    Apr. 16, 2015

Related U.S. Application Data

(60) Provisional application No. 61/890,024, filed on Oct. 11, 2013.

(51) Int. Cl.
| | |
|---|---|
| *B23P 6/04* | (2006.01) |
| *B23P 6/02* | (2006.01) |
| *F02F 1/26* | (2006.01) |
| *F16N 5/02* | (2006.01) |

(52) U.S. Cl.
CPC ... *B23P 6/04* (2013.01); *B23P 6/02* (2013.01); *F02F 1/26* (2013.01); *F16N 5/02* (2013.01); *Y10T 29/49233* (2015.01); *Y10T 137/598* (2015.04)

(58) Field of Classification Search
CPC ......... B23P 6/04; B23P 6/02; Y10T 137/598; Y10T 29/49233; F02F 1/26; F16N 5/02
See application file for complete search history.

(56) References Cited

U.S. PATENT DOCUMENTS

| | | |
|---|---|---|
| 3,405,575 A | 10/1968 | Riscky |
| 3,449,815 A | 6/1969 | Jones, Jr. et al. |
| 4,986,862 A | 1/1991 | Matsufuru |
| 5,341,554 A | 8/1994 | Diperstein |
| 5,499,892 A | 3/1996 | Reed |
| 5,873,163 A | 2/1999 | Diefenthaler et al. |
| 6,195,886 B1 | 3/2001 | Azuma |
| 6,311,652 B2 | 11/2001 | Azuma |

*Primary Examiner* — Ryan J Walters
(74) *Attorney, Agent, or Firm* — Hartman Titus PLC; John D. Titus

(57) ABSTRACT

An apparatus and method are presented for repairing damage to the boundary wall between an engine coolant passage and a fuel injector bore in a cylinder head. The method involves removing the fuel injector from the fuel injector bore adjoining the damaged boundary wall and inserting a purpose-built sealant injector tool into the fuel injector bore. The sealant injector tool is dimensionally equivalent to the fuel injector in critical regions so that it conforms to the interior surface of the fuel injector bore. Sealant is injected into the sealant injector tool at high pressure until the sealant flows into the crack between the fuel injector bore and the coolant passage after which the sealant injector tool is removed and the fuel injector reinstalled.

14 Claims, 3 Drawing Sheets

−PRIOR ART−

METHOD AND APPARATUS FOR REPAIRING A CYLINDER HEAD

BACKGROUND OF THE INVENTION

This invention relates generally to water-cooled internal combustion engines and in particular to apparatus and methods for repairing water-cooled internal combustion engines.

Water-cooled internal combustion engines typically have one or more cylinder heads that define the upper portions of the combustion chambers of the engine. Each of the cylinder heads will ordinarily have various coolant passages that allow engine coolant (usually a mixture of ethylene glycol or propylene glycol and water) to flow through the cylinder head to cool the cylinder head in the vicinity of the combustion chamber, exhaust valves and other critical areas. Experience has shown, however, that cracks or other damage can occur in the boundary walls separating the coolant passages from other areas of the cylinder head, especially on high-mileage engines or if the engine has experienced overheating due to coolant loss.

It is desirable to repair, rather than replace, damaged cylinder heads because of the high cost associated with replacement of the damaged cylinder head. According to one prior art method, a crack sealant is introduced into the engine coolant and the engine is run up to temperature for a period of time. The heat and pressure of the engine coolant forces the crack sealant into the damaged area to seal the crack. Because this prior art method relies on coolant pressure (typically 7-15 psi) to force coolant containing the crack sealant into the crack, this method is adequate only if the crack leads from a coolant passage to the outside or other region of the cylinder head that is at a lower pressure than the coolant pressure.

In a conventional diesel engine such as the International® VT365 (also known as the 6.0 L Ford® Powerstroke™ diesel engine) fuel is supplied to the fuel injectors through a fuel passageway formed in the cylinder head. The fuel in the fuel passageway is supplied from the fuel pump at a medium pressure (about 60 psi) and flows through the fuel passageway into each of the fuel injector bores formed in the cylinder head. The fuel injectors intake the medium pressure fuel from the fuel injector bores and inject the fuel into the combustion chamber at very high pressure (above 3000 psi).

It has been discovered that frequently cracks or other damage may occur in the boundary wall separating the fuel injector bores from the coolant passages. When this occurs, fuel inside the fuel injector bore is forced by the fuel pump through the crack where it enters the coolant passage and mixes with the engine coolant. Prior art methods of injecting crack sealant into the cooling system are inadequate to repair this type of crack because the fuel pressure is greater than the coolant pressure and therefore the crack sealant cannot be forced into the crack to repair it.

SUMMARY OF THE INVENTION

The present invention comprises an apparatus and method for repairing damage to the boundary wall between an engine coolant passage and a fuel injector bore in a cylinder head. According to an illustrative embodiment, the method involves removing the fuel injector from the fuel injector bore adjoining the damaged boundary wall and inserting a purpose-built sealant injector tool into the fuel injector bore. The sealant injector tool is dimensionally equivalent to the fuel injector in critical regions so that it conforms to the interior surface of the fuel injector bore. The tool may include features that enable it to be retained and oriented within the fuel injector bore using the fuel injector retainer. Sealant is injected into the sealant injector tool at high pressure until the sealant flows into the crack between the fuel injector bore and the coolant passage after which the sealant injector tool is removed and the fuel injector reinstalled.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
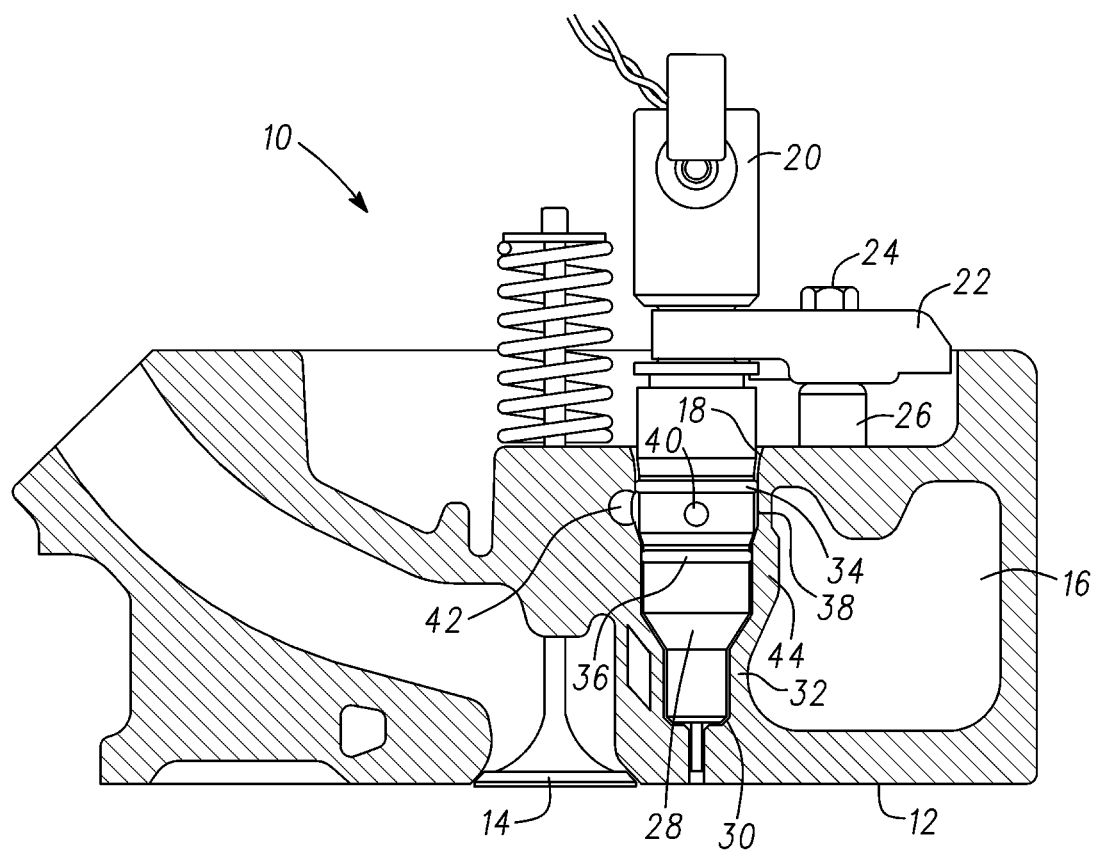
FIG. 1 is a cross sectional view of a cylinder head suitable to be repaired by a method incorporating features of the present invention

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1, a cylinder head 10 for a water-cooled internal combustion engine has a lower surface 12 that engages the upper surface of the cylinder block (not shown) to define the engine combustion chambers. Cylinder head 10 conventionally includes one or more intake valves 14 and a plurality of coolant passages including coolant passage 16. In the illustrative embodiment of FIG. 1, cylinder head 10 is the cylinder head for a 2003-2010 Ford® Powerstroke™ diesel engine, also known as the International® VT365 diesel engine. Cylinder head 10 includes a fuel injector bore 18. A fuel injector 20 is received in fuel injector bore 18 and is retained by injector retainer 22 which is held in place by means of a bolt 24 threaded into boss 26 formed in cylinder head 10. The lower portion 28 of fuel injector 20 engages a steel fuel injector sleeve 30 which is pressed into the lower portion 32 of fuel injector bore 18.

Fuel injector 20 includes an upper O-ring 34 and a lower O-ring 36 which seal against the sides of fuel injector bore 18 to form an annular fuel reservoir 38. Fuel injector 20 draws fuel from annular fuel reservoir 38 through inlet port 40 and injects the fuel into the cylinder at high pressure for combustion. Fuel is supplied to annular fuel reservoir 38 by means of a fuel passage 42 running along the length of cylinder head 10, which intersects with annular fuel reservoir 38. Fuel pressure is maintained in fuel passage 42 and in annular fuel reservoir 38 at approximately 60 psi by the vehicle fuel pump. As noted hereinbefore, it is been observed that cracks or other damage to the barrier wall 44 separating coolant passage 16 from fuel injector bore 18 in the region of annular fuel reservoir 38 will cause diesel fuel at 60 psi to be forced into coolant passage 16.

With reference to FIGS. 2-6, in accordance with the present invention, after removing fuel injector 20, a sealant injector tool 50 is inserted into fuel injector bore 18 of cylinder head 10. Sealant injector tool 50 comprises a substantially cylindrical body having a shape that generally corresponds to the outer contour of fuel injector 20 and, in particular, includes a barrier wall engaging section 52 having an upper section 54 which has a relatively larger diameter, a lower section 56 which has a relatively smaller diameter, and an intermediate tapered conical section 58 joining upper section 54 and lower section 56.

Sealant injector tool 50 has an internal passage 60 which leads to an exit port 62 located in barrier wall engaging section 52. Preferably a cruciform channel 64 is formed in barrier wall engaging section 52 to assist in the distribution of sealant exiting exit port 62. Cruciform channel 64 intersects with exit port 62 and extends into upper section 54 and lower section 56. Sealant injector tool 50 also includes an O-ring groove 66 which extends around cruciform channel 64 and exit port 62. O-ring 68 (FIG. 2) is inserted into O-ring groove 66 to provide a seal around cruciform channel 64 during use. Although the illustrative embodiment incorporates an O-ring 68, other methods of sealing around exit port 62 for example a molded seal, may be incorporated, without departing from the scope of the invention. An indexing notch 70 is formed in sealant injector tool approximately 45° clockwise from the centerline of exit port 62 to ensure correct rotational orientation of sealant injector tool 50 during use.

In the illustrative embodiment, internal passage 60 includes an opening 72 at the upper end of sealant injector tool 50. Opening 72 is provided with internal threads adapted to receive a conventional Zerk fitting 74. Zerk fitting 74 is capable of coupling to a conventional grease gun (not shown) which enables substantial hydraulic pressure to be applied within internal passage 60.

Figure 2:
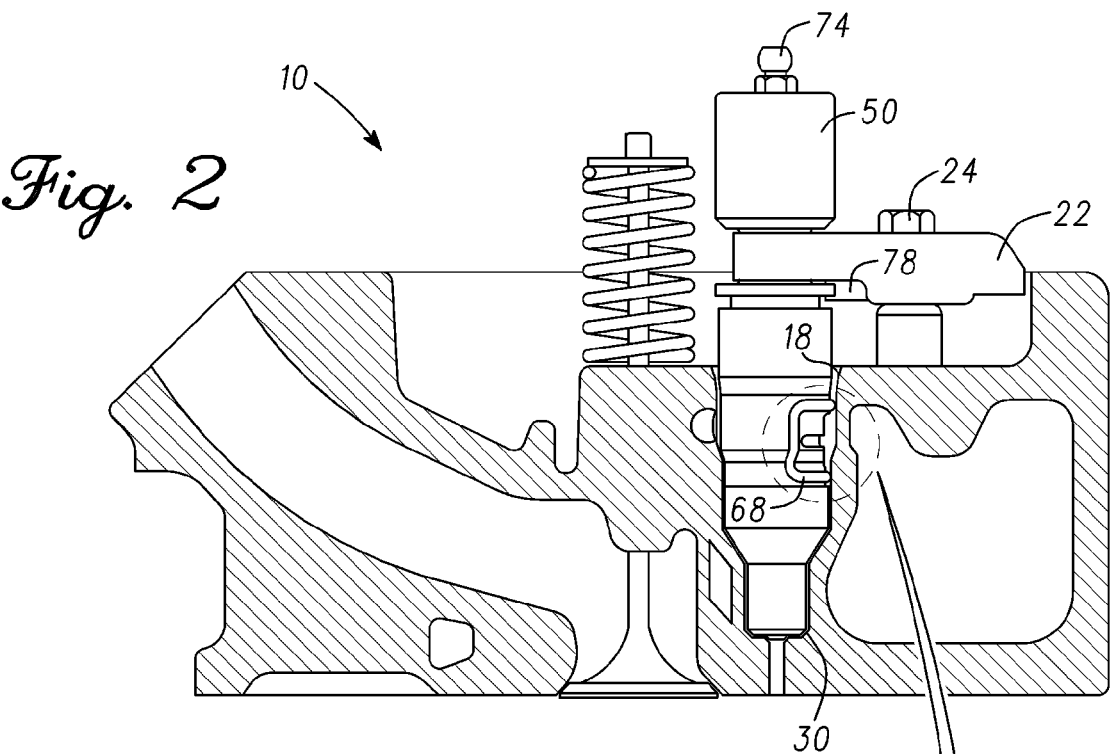
FIG. 2 is a cross-sectional view of the cylinder head of FIG. 1 with the sealant injector tool installed.
Figure 3:
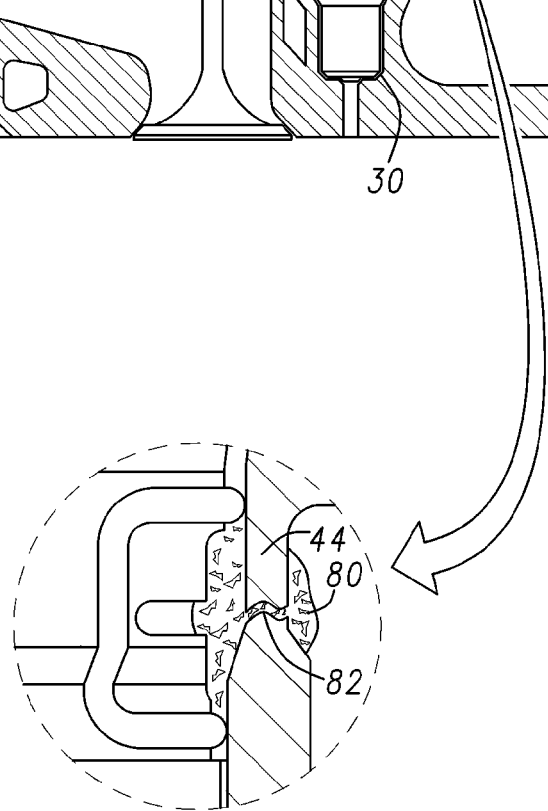
FIG. 3 is an enlarged sectional view cylinder head of FIG. 2.
Figure 4:
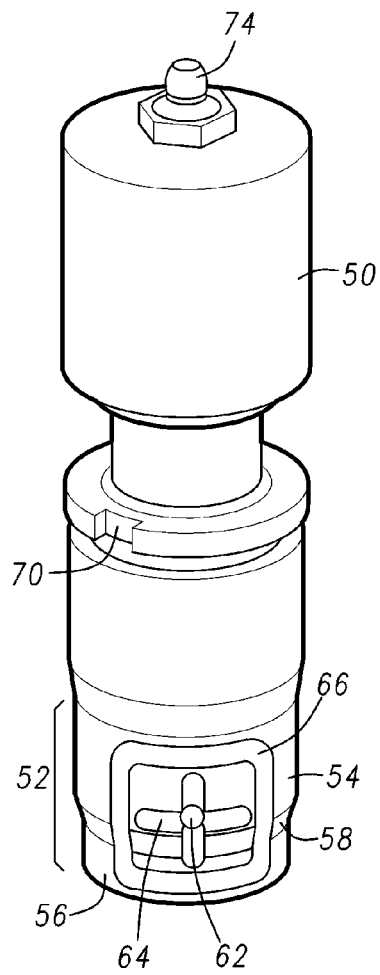
FIG. 4 is a perspective view of a sealant injector tool incorporating features of the present invention.
Figure 5:
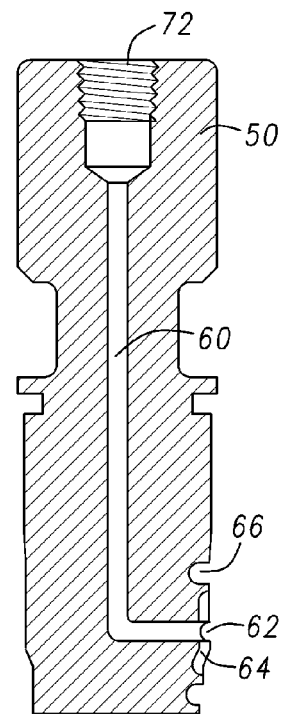
FIG. 5 is a cross-sectional view of the sealant injector tool of FIG. 4.
Figure 6:
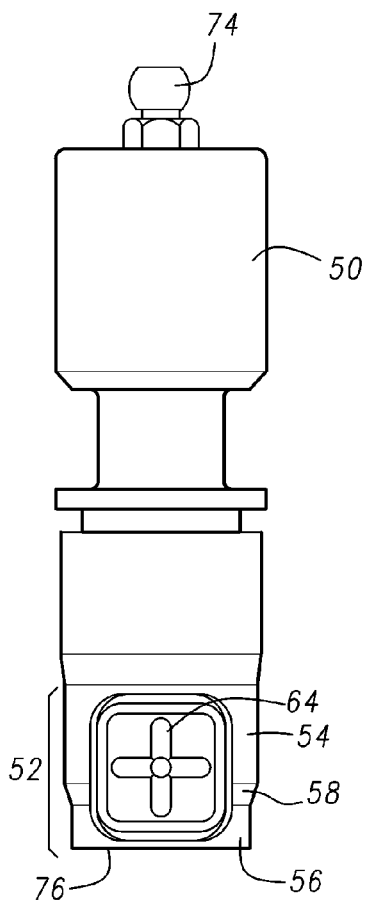
FIG. 6 is a front view of the sealant injector tool of FIG. 4.

With particular reference to FIGS. 2-3, after fuel injector 20 has been removed from fuel injector bore 18, sealant injector tool 50 is inserted into fuel injector bore 18 until the lower end 76 of sealant injector tool 50 engages fuel injector sleeve 30 in the lower portion 32 of fuel injector bore 18. Fuel injector retainer 22 is used to secure sealant injector 50 tightly against fuel injector sleeve 30 and so that O-ring 68 forms a pressure tight seal against barrier wall 44 of fuel injector bore 18. Tab 78 of fuel injector retainer 22 engages indexing notch 70 of sealant injector tool 50 to ensure sealant injector tool 50 is held in the correct rotational orientation.

According to the illustrative embodiment, a sealant 80, which is preferably an anaerobic sealant such as Loctite® 294 is injected into internal passage 60 using a conventional grease gun at a pressure of at least 100 psi, preferably from 200 to 800 psi, and most preferably about 500 psi until it flows through the damaged region 82 of barrier wall 44 and forms a permanent repair.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment sealant 80 is injected into internal passage 60 using a conventional grease gun, other methods of supplying hydraulic pressure are considered within the scope of the invention. Also, although in the illustrative embodiment the sealant injector tool 50 is retained by the fuel injector retainer, any method of retaining the sealant injector tool may be incorporated without departing from the invention such as use of a purpose-built retainer that threads into a threaded aperture formed in the head or a self-wedging sealant injector tool having a bicycle stem wedge and bolt or similar retaining assembly. Additionally, internal passage 60 may be formed without opening 72 such that internal passage 60 is closed at the top. A source of compressed gas such as carbon dioxide, a pyrotechnic gas generator, or hybrid pyrotechnic gas generator may be provided to supply pressure for forcing sealant 80 into the damaged region 82 of barrier wall 44. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term is defined to mean"

What is claimed is:

1. In a fluid-cooled internal combustion engine of the type having a combustion chamber and a cylinder head defining a portion of the combustion chamber wherein the cylinder head includes a cooling fluid passageway, a fuel injector bore and a boundary wall between the fuel injector bore and the cooling fluid passageway, a method of repairing a damaged portion of the boundary wall between the fuel injector bore and the cooling fluid passageway, the method comprising:
   disconnecting a fuel injector retaining clamp from a fuel injector;
   removing the fuel injector from the fuel injector bore;
   providing a sealant injector tool, the sealant injector tool comprising a generally cylindrical body having a lower portion adapted to conform to the dimensions of the fuel injector bore, the sealant injector tool having an internal passage with an outlet aperture, the outlet aperture being located along a lateral wall of the lower portion of the body, the sealant injector tool further comprising a seal-receiving recess formed around the outlet aperture;
   installing a resilient seal into the seal-receiving recess;
   providing a sealant within the internal passage;
   inserting the sealant injector tool into the fuel injector bore with the sealant injector tool oriented so that the resilient seal forms a pressure-tight seal between the outlet aperture and the damaged portion of the boundary wall;
   applying pressure to the sealant until it exits via an exit port;
   flowing the sealant under pressure from the exit port into the damaged portion of the boundary wall, the sealant flowing into the damaged portion of the boundary wall from the fuel injector bore side of the boundary wall toward the coolant passage side of the boundary wall; and
   removing the sealant injector tool from the fuel injector bore.

2. The method of claim 1, further comprising:
   reinstalling the fuel injector into the fuel injector bore.

3. The method of claim 1, further comprising:
applying a solvent to the damaged portion of the boundary wall before inserting the sealant injector tool into the fuel injector bore.

4. The method of claim 1, wherein:
the sealant is injected into the passage at a pressure of at least 100 psi.

5. The method of claim 1, wherein:
the sealant is injected into the passage at a pressure of at least 500 psi.

6. The method of claim 1, wherein:
the sealant injector tool has an inlet aperture in fluid communication with the internal passage and pressure is applied to the sealant from an external source via the inlet aperture.

7. The method of claim 6, wherein:
the external source is a grease gun.

8. The method of claim 1, wherein:
the internal passage in the sealant injector tool contains a cartridge of stored, compressed gas and pressure is applied to the sealant by releasing the stored, compressed gas.

9. The method of claim 1, wherein:
the sealant injector tool is retained during use by a retainer threaded into a threaded boss in the cylinder head.

10. The method of claim 9, wherein:
the retainer is the fuel injector retaining clamp.

11. The method of claim 1, wherein:
the sealant injector tool has an indexing feature to fix the rotational orientation of the exit port.

12. The method of claim 1, wherein:
the fuel injector bore has an upper and a lower end with a fuel injector sleeve proximal the lower end; and
the sealant injector tool is inserted into the fuel injector bore until the injector tool engages the fuel injector sleeve.

13. The method of claim 1, wherein:
the outlet aperture of the sealant injector tool comprises a cruciform recess juxtaposed against the damaged portion of the boundary wall.

14. The method of claim 1, wherein:
the damaged portion of the boundary wall comprises a crack extending between the fuel injector bore and the cooling fluid passage.

* * * * *